United States Patent [19]

Beck et al.

[11] Patent Number: 5,264,410

[45] Date of Patent: * Nov. 23, 1993

[54] SECURITY LAMINATES

[75] Inventors: Nicholas C. Beck; Paul A. Edwards, both of Essex; Richard A. Hann, Suffolk; Gary W. Morrison, London, all of England

[73] Assignee: Imperial Chemical Industries PLC, London, United Kingdom

[*] Notice: The portion of the term of this patent subsequent to Mar. 10, 2009 has been disclaimed.

[21] Appl. No.: 699,619

[22] Filed: May 15, 1991

[30] Foreign Application Priority Data

May 15, 1990 [GB] United Kingdom ............... 9010888

[51] Int. Cl.$^5$ ...................... B41M 5/035; B41M 5/38
[52] U.S. Cl. ..................... 503/227; 428/195; 428/203; 428/412; 428/447; 428/500; 428/913; 428/914
[58] Field of Search ................ 8/471; 428/195, 203, 428/412, 520, 522, 913, 914, 447, 480, 500; 503/227

[56] References Cited

U.S. PATENT DOCUMENTS 4,599,259 7/1986 Kobayashi et al. ............... 428/204
5,095,002 3/1992 Beck et al. ..................... 503/227

Primary Examiner—B. Hamilton Hess
Attorney, Agent, or Firm—Cushman, Darby & Cushman

[57] ABSTRACT

A security laminate comprises a thermal transfer print having a receiver layer comprising a thermoplastic dye-receptive polymer doped with a cross-linked silicone-containing release system in which the total silicone content is reduced to 0.01-1% by weight of the thermoplastic dye-receptive polymer, and a cover sheet of plastics material bonded to the receiver layer by heat and pressure, preferably without further adhesives between the print and cover sheet.

9 Claims, 1 Drawing Sheet

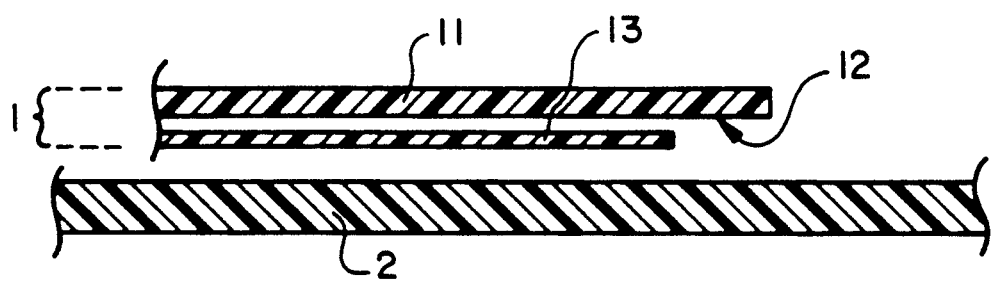

SECURITY LAMINATES

The invention relates to security laminates, in which an information-carrying sheet is laminated to a protective cover sheet in such a way that the information is readable while the laminate remains intact, and in particular to such laminates wherein the information-carrying sheet is a thermal transfer print. The invention also relates to thermal transfer receiver sheets suitable for making information-carrying sheets for security laminates.

Security laminates are used in a variety of applications, some requiring machine readable information (e.g. barcodes) or, more usually, human readable information (e.g. a photograph with signature and relevant text), or a mixture of the two. Their usage ranges from low to high security applications, and while the present invention is of particular benefit in the latter, it can also be employed in simpler applications with lower security needs.

Low security laminates may simply be required to protect the surface of the thermal transfer print or to provide a means for holding readable information in a form that can be attached to an article to identify it, e.g. as a luggage label carrying as information the name, address and perhaps a photograph of its owner. Examples of high security applications include cardkeys and security passes, in which the laminate must also be tamper proof to prevent any alteration of the information carried, or such that the information is destroyed when attempts are made to tamper with the laminate.

At present, information-carrying sheets for such applications typically have at least one side carrying pictorial information in the form of a normal optical photograph, including typed script and/or signatures as appropriate, with the emulsion side of the photograph laminated to a cover sheet of thermoplastics film, using a suitable adhesive. At least one of the photograph and cover sheet must be sufficiently transparent for the photograph to be viewed after lamination. There may also be a second cover sheet on the other side of the photograph, such that the two cover sheets form a pouch in which the photograph is bonded using an appropriate adhesive.

An alternative to optical photography as a means of producing pictorial representations of persons, signatures, graphics and other such form of information, is thermal transfer printing. However, while this technology can provide some advantages, particularly in its versatility, it can also produce difficulties in lamination.

Thermal transfer printing is a generic term for processes in which one or more thermally transferable dyes are caused to transfer from a dyesheet to a receiver in response to thermal stimuli. Using a dyesheet comprising a thin substrate supporting a dyecoat containing one or more dyes uniformly spread over an entire printing area of the dyesheet, printing is effected by heating selected discrete areas of the dyesheet while the dyecoat is held against a dye-receptive surface of a receiver sheet, thereby causing dye to transfer to corresponding areas of the receiver. The shape of the pattern transferred is thus determined by the number and location of the discrete areas which are subjected to heating. Full colour prints can be produced by printing with different coloured dyecoats sequentially in like manner, and the latter are usually provided as discrete uniform print-size areas, in a repeated sequence along the same dyesheet.

High resolution photograph-like prints can be produced by thermal transfer printing using appropriate printing equipment, such as a programmable thermal print head or laser printer, controlled by electronic signals derived from a video, computer, electronic still camera, or similar signal generating apparatus. A typical thermal print head has a row of tiny heaters which prints six or more pixels per millimeter, generally with two heaters per pixel. The greater the density of pixels, the greater is the potential resolution, but as presently available printers can only print one row at a time, it is desirable to print them at high speed with short hot pulses, usually from near zero up to about 10 ms long, but even up to 15 ms in some printers, with each pixel temperature typically rising to about 350° C. during the longest pulses.

Receiver sheets comprise a sheet-like substrate supporting a receiver layer of a dye-receptive polymer composition, into which the dye molecules can readily diffuse when heated during printing. Examples of dye-receptive polymers include saturated polyesters which are soluble in common solvents to enable them to be applied to the substrate as coating compositions. However, these are thermoplastic polymers with softening temperatures below the temperatures used during printing, and although the printing pulses are so short, they can be sufficient to cause a degree of melt bonding between the dyecoat and receptive layer, the result being total transfer to the receiver of whole areas of the dyecoat, rather than just the single pixels heated. The amount of total transfer can vary from just a few pixels being transferred in addition to those required, to the two sheets being welded together over the whole print area.

To overcome such total transfer problems arising during printing, there have been various proposals for adding release agents, either as a coating over the receiver layer or, more usually, in the receiver layer itself. Particularly effective release systems include silicones and a cross-linking agent to stabilise the coat and prevent the silicone migrating. Both reaction parts may contain silicones, but generally not. Total silicone content is typically 2-8% by weight of the dye-receptive polymer, and at least sufficient cross linking agent to react with substantially all silicone-containing molecules, as free silicone can itself lead to total transfer problems. Unfortunately, the very release properties that are required during printing, make it difficult to adhere receiver layers containing such release systems, to the protective cover sheets required in security laminates. Indeed, with many of the various adhesives that have previously been proposed for such purposes, even when adhesion has apparently been obtained, the cover sheet may still be peeled off the printed receiver layer (especially at elevated temperatures) to leave intact and unprotected against forgery, the information printed in the receiver layer.

We have now found that whereas such high levels of silicone are normally desirable to take into account the effects of ageing on the release properties, good release during printing can be obtained with much lower concentrations of silicone in unaged receiver layers, and moreover, we have now discovered that very effective and secure bonding can be achieved when using only such lower effective quantities of silicone, even to the extent that adhesive layers need not always be added.

According to a first aspect of the present invention, a security laminate comprises a) a printed thermal transfer receiver sheet having a sheet-like substrate supporting a receiver layer comprising a thermoplastic dye-receptive polymer doped with a cross-linked silicone-containing release system in which the total silicone content lies within the range 0.01-1% by weight of the thermoplastic dye-receptive polymer, and into at least part of which has been diffused a print of one or more thermal transfer dyes, and b) a cover sheet of plastics material bonded to the printed receiver layer, at least one of the base sheet and the cover sheet having sufficient transparency for the print to be visible from outside the laminate.

The cover sheet can be a supportive card-like sheet, even to the extent of being the major contributor to the total thickness of the final laminate. Such cover sheets are particularly suitable for stand-alone uses; credit cards, security cards and card-keys being examples, where suitable thicknesses may typically be about 200 $\mu$m for the cover sheet and about 50 $\mu$m for the receiver sheet. Apart from the support it provides, the cover sheet also provides protection for the receiver layer and the print it contains, as this layer thus becomes sandwiched between the receiver substrate and the cover. Generally, for such applications we prefer that the thicker cover sheet be opaque, using for example a plastics sheet (e.g. polyvinylchloride or polycarbonate) filled with white pigment, with a relatively thin transparent receiver substrate which is transparent, to enable to be viewed the print it carries and which is sandwiched between the substrate and opaque cover sheet.

Information can be provided on both sides of such laminates, e.g. by conventional printing on one side of the supporting cover, and a bonded thermal transfer print on the other. A variant on this is a full double sided transfer printed laminate, having printed receiver sheets bonded to both sides of a single cover sheet. In such variants we prefer for most applications to use transparent substrates for both receivers, with the cover sheet (which is thus sandwiched between them) being opaque, so that each print is visible but only from one side. However, this is not to preclude the use of a transparent cover sheet where appropriate for special effects.

The supportive cover sheet may itself be a laminate, this being useful where a particular surface texture or design is required on the back of the laminate, for example, or some functional feature (e.g. a card-key key function) is to be concealed between the layers of the laminated cover sheet.

Security laminates can also have a second cover sheet on the back of the receiver sheet, i.e. on the side remote from the receiver layer, so as to sandwich the receiver sheet between the two cover sheets. For such applications, much thinner sheets, such as transparent thermoplastic films, may generally be preferred. These laminates include pouch laminates in which both cover sheets have peripheral portions extending beyond the edges of the receiver sheet, these extended peripheral portions being bonded to each other. Within this pouch is secured the printed receiver sheet with its receiver layer bonded to the overlying cover sheet.

In such configurations, it may not always be necessary also for the back of the receiver sheet to be bonded to its overlying cover sheet, but generally this is preferable to having a thin air film between them, although the method of bonding need not be the same on the two sides of the printed receiver sheet. Where the second cover sheet does not have extending peripheral portions, however, it is essential that it be bonded to the back of the receiver sheet to hold it in place, although the method or means used may likewise be different from that used to bond the receiver layer to the first cover sheet.

As noted above, we have discovered that with our lower quantities of silicone, very effective and secure bonding can be achieved, even to the extent that adhesive layers need not always be added. Indeed, our preferred laminate is one wherein the cover sheet is bonded directly to the receiver layer of the receiver sheet, being free from any layer of added adhesive therebetween. We have found that with some thermoplastic cover sheets, notably those of a filled white polyvinylchloride or polycarbonate composition, such direct bonding can readily be effected simply by heating in a laminating press. This surprising ability to obtain bonding directly between the receiver layer and the cover sheet not only simplifies production of the laminates, but also may provide greater security, as many common adhesive layers will themselves often flow to allow the adhered laminae to be pealed apart undamaged, especially at elevated temperatures.

We have found that the minimum temperature required for obtaining direct bonding in this manner is dependent on the receiver silicone content. While the lower end of the above range may provide, for example, good bonds at around 100° C. (depending on the chemical nature of the other components), larger silicone contents of around 1% in otherwise corresponding systems may require much higher laminating temperatures, e.g. 150° C. (these specific values are given as illustrations of temperatures we have successfully used on one commercial hot roll laminator, but may require modifying on other laminators).

As indicated above, adhesive-free laminates are most readily obtained with the lower amounts of silicone, but when using particularly small amounts, eg 0.05% and lower, it becomes increasingly important not to allow undue aging of the receiver layer prior to printing. Thus in practice (as recorded in the Examples hereinafter), we have achieved trouble-free printing even with such particularly low silicone-content receiver compositions, by using freshly prepared receiver sheets. The rate of aging depends very much on the conditions under which the receivers are kept. Where the conditions are not particularly humid and not particularly warm, even quite low silicone-content material may be fully useable for several months. However, aging appears to commence as soon as the receivers are made, and in view of the dependency on the storage conditions of the aging rate, we prefer to use such receivers as soon after manufacture as possible. With older particularly low silicone receivers, total transfer is increasingly likely to occur during printing.

From manufacturing considerations, it is generally desirable for laminates comprising a printed receiver sheet and a single cover sheet to have substrate, receiver layer and cover sheet coterminous along all edges, but that is not essential. For example, the receiver layer may be of smaller area than the other two, but in that case other adhesion means eg adhesives, may need to be provided to give adhesion between the cover sheet and those parts of the receiver substrate which are uncoated by receiver layer. More readily provided are variants in which the whole area of substrate has a receiver layer, but where the receiver sheet only covers a portion of the cover sheet surface.

According to a second aspect of the present invention, a thermal transfer receiver sheet for making security laminates comprises a sheet-like substrate supporting a receiver layer comprising a thermoplastic dye-receptive organic polymer doped with a cross-linked silicone-containing release system in which the total silicone content lies within the range 0.01-1% by weight of the thermoplastic dye-receptive polymer.

The dye-receptive organic polymer forms the bulk of the receiver layer composition. This may comprise a single species of polymer, or may be a mixture. Particularly suitable dye-receptive organic polymers are the saturated polyesters (i.e. referring to reactive ethylenic unsaturation, as many such suitable polyesters do contain one or more aromatic groups per repeat unit). Examples of these which are commercially available include Vitel PE 200 (Goodyear), and Vylon polyesters (Toyobo), grades 103 and 200 being particularly suitable. The organic polymer composition may also contain additional polymers, such as polyvinyl chloride/polyvinyl alcohol copolymer, for example.

Preferred release systems comprise a thermoset reaction product of at least one silicone having a plurality of hydroxyl groups per molecule and at least one organic polyfunctional N-(alkoxymethyl) amine resin reactive with such hydroxyl groups under acid catalysed conditions. The silicones can be either branched or linear, although the latter may give better flow properties, which can be helpful during the substrate coating process. The hydroxyl groups can be provided by copolymerising a silicone moeity with a polyoxyalkylene to provide a polymer having molecules with terminal hydroxyls, these being available for reaction with the amino resins. A difunctional example of such silicone copolymers is polydimethylsiloxane polyoxyalkylene copolymer. These have linear molecules with two terminal hydroxyls per molecule, and to obtain the multiple cross-linking of a thermoset product, they require an N-(alkoxymethyl) amine resin having a functionality of at least 3. Hydroxyorgano functional groups can also be grafted directly onto the silicone backbone to produce a cross-linkable silicone suitable for the composition of the present invention. Examples of these include Tegomer HSi 2210, which is a bis-hydroxyalkyl polydimethylsiloxane. Again having a functionality of only 2, a cross-liking agent having a greater functionality is required to achieve a thermoset result.

Preferred polyfunctional N-(alkoxymethyl) amine resins include alkoxymethyl derivatives of urea, guanamine and melamine resins. Lower alkyl compounds (i.e. up to the $C_4$ butoxy derivatives) are available commercially and all can be used effectively, but the methoxy derivative is much preferred because of the greater ease with which its more volatile by-product (methanol) can be removed afterwards. Examples of the latter which are sold by American Cyanamid in different grades under the trade name Cymel, are the hexamethoxymethylmelamines, suitably used in a partially prepolymerised form to obtain appropriate viscosities. Hexamethoxymethylmelamines are 3-6 functional, depending on the steric hindrance from substituents and are capable of forming highly cross-linked materials using suitable acid catalysts, e.g. p-toluene sulphonic acid (PTSA). However, the acids are preferably blocked when first added, to extend the shelf life of the coating composition, examples include amine-blocked PTSA (eg Nacure 2530) and ammonium tosylate.

We find that any free silicone may lead to total transfer problems, and prefer to use at least an equivalent amount of the amine resin.

The release system is cured after the polyfunctional silicone and cross-linking agent have been added to the dye-receptive polymer composition, the catalyst mixed in and the mixture applied as a coating onto the substrate or onto any undercoat that may previously have been applied to the substrate.

Preferred receivers for use in the present laminates are those with substrates of smooth thermoplastic films, such as linear polyesters, especially orientated films of polyethylene terephthalate. These are dimensionally stable, even during the laminating processes described herein, and can be made in both opaque and transparent grades, with smooth glossy surfaces.

As the prime aim of the present reduced silicone compositions is to enable effective bonding to be achieved during lamination, it is desirable that adhesion between the receiver layer and the substrate be at least as strong as the bond to the cover sheet made during lamination, otherwise delamination may occur by failure at that substrate/receiver layer interface instead, and all the risks in using such low levels of release agent will be to no avail. This may not be a problem for rougher substrates, such as fibrous and synthetic papers, but for smooth thermoplastic films, we prefer that the substrate surface be pretreated to enhance its adhesion capabilities, before application of the receiver layer thereto. In particular, this can provide noticeable improvements to the security of laminates made with transparent grades of our preferred substrates, the orientated polyethylene terephthalate films.

Pretreatment may be in the form of a chemical or physical etch to modify the surface structure of the substrate, or a coating of bonding material adhering well to both substrate and receiver layer, may be applied. When the plastics film is a linear polyester such as polyethylene terephthalate, the pretreatment may involve the application to the film surface of a composition having a swelling or solvent action upon the film. A preferred pretreatment composition is a solution in an organic solvent, such as acetone or methanol, of p-chloro-m-cresol, 2,4-dichlorophenol, 2,4,6- or 2,4,5-trichorophenol, 4-chlororesorcinol, or a mixture of such materials in a common solvent. If desired, the pre-treatment solution may contain a polymeric component, e.g. a copolymer of vinyl chloride and vinyl acetate. After such a solution has been applied to the film surface, it may be dried at an elevated temperature for a few minutes before applying the receiver layering composition.

Adhesion-promoting subbing layers which may be used either alone or with an etch treatment, are polymeric layers containing the same dye-receptive polymers as are to be used in the receiver layer (e.g. saturated polyester) or containing a component reactive with the receiver layer (e.g. a cross linked polymer having a excess of the cross linking agent to be used in the release system of the receiver layer). If the film is produced by a process of molecular orientation which is normally achieved by stretching in one or more directions, it is convenient to apply the polymeric subbing layer during the film production. Usually, orientated films are biaxially orientated by stretching in two mutually perpendicular directions. The subbing layer may be applied before the stretching is commenced, or preferably between the sequential stretching operations in the two directions.

In addition to their receiver layers and any subbing layers, the receiver sheets may also have other coatings, such as antiblocking backcoats and/or antistatic coatings or treatments, to assist handling during and prior to printing.

Receiver sheets according to the second aspect of the invention can be sold and used in the configuration of long strips packaged in a cassette, or cut into individual print size portions, or otherwise adapted to suit the requirements of whatever printer they are to be used with (whether or not this incorporates a thermal print head or alternative printing system), to take full advantage of the properties provided hereby.

The invention is illustrated by reference to a specific embodiment shown in the accompanying drawing, which is a diagrammatical representation of a cross section through a laminate according to the present invention, the parts being slightly exploded to aid understanding.

The laminate illustrated has a receiver sheet 1 bonded to a cover sheet 2. The receiver consists of a substrate of transparent biaxially orientated polyethyleneterephthalate film 11 (e.g. OHP grade Melinex from ICI). The lower surface 12 (as positioned in the drawing) has been pretreated with a chlorophenol etch, as described above, and provided with a receiver layer 13. This contains both dye-receptive polymer and a silicone release system, and was applied as a solution in organic solvents, before being dried and cured to give the coating shown. The coversheet 2 is a matt-surfaced, white, opaque sheet of PVC, to which the receiver layer has been bonded by heat and pressure, without any layer of adhesive inserted between them.

EXAMPLE 1

To illustrate further the present invention, security laminates were prepared essentially as shown in FIG. 1. A large web of 50 μm thick transparent biaxially orientated polyester film was pretreated with chlorophenol etch on one side, followed by one of a series of receiver layer coating compositions differing only in silicone content, and consisting of:

| | |
|---|---|
| Vylon 200 | 100 parts by weight |
| Tegomer HSi 2210 | 0.13–0.8 parts by weight |
| Cymel 303 | 0.8 parts by weight |
| Nacure 2530 | 0.2 parts by weight |
| Tinuvin 900 | 2.0 parts by weight |
| toluene/MEK | 40/60 solvent mixture |

The Vylon 200 is a dye-receptive linear polyester. Tegomer HSi 2210 is a bis-hydroxyalkyl polydimethylsiloxane sold by Goldshmidt, cross-linkable by the Cymel 303 under acid conditions to provide a release system effective during printing. Nacure 2538 is an amine-blocked p-toluene sulphonic acid catalyst, and Tinuvin 900 is a UV stabiliser.

These coating compositions were made by mixing three functional solutions, one containing the dye-receptive Vylon and the Tinuvin UV absorber, a second containing the Cymel cross linking agent, and the third containing both the Tegomer silicone release agent and the Nacure solution to catalyse the crosslinking polymerisation between the Tegomer and Cymel materials. These were then mixed immediately prior to coating, and the quantity of solvent adjusted to give a final solution with an approximately 12% total solids content.

Using in-line machine coating, the receiver composition was coated onto the chlorophenol-primed surface of the polyester film, dried and cured to give a dye-receptive layer about 4 μm thick.

The receiver sheets were clear and transparent, and mainly were printed using an Atlantek thermal transfer printer with a single colour dyesheet, to give high quality transparencies suitable for overhead projection, with no evidence of total transfer having occurred during printing. A few small test pieces were also printed on a smaller laboratory printer, with similar results.

Samples of the printed receiver sheet were then placed onto 200 μm thick polyvinylchloride ("PVC") cover sheets (Staufen Folien PVC grades 24.4 and 27.4) with their receiver layers in direct contact with the PVC. Using an Ozatec HLR 350 hot roll laminator, with a roll speed set at 0.5 m/min, the temperature at 200° C. and an operational air pressure (for biasing the roller) of 5 atmospheres, lamination was carried out in two passes, i.e. forwards into the laminator, and then backwards (at the same speed and pressure) to bring the laminated material out of the front of the laminator. No additional form of adhesive was provided.

Samples of the laminates were then tested for security by pulling apart the substrate and cover sheet. All laminations were found to give such good adhesion that the Melinex substrate tore rather than delamination occurring.

What was also surprising, was the quality of the final print. Despite the elevated temperatures used to form the laminate, there appeared to have been very little lateral flow of the dye molecules. The laminated print looked to have as good a resolution as that prior to lamination, the only perceptible difference noted being a possible slight reduction in any graininess.

EXAMPLE 2

The above Example was repeated using different lower laminating temperatures. Laminating temperatures as low as 120° C. were found to give similar results to those of Example 1, when using silicone contents of 0.13%. However, when using higher silicone contents we found that higher temperatures were required to obtain similar results. Thus, whereas 0.8% loadings of silicone would give such strong results when lamination was carried out at 200° C., progressively weaker results were obtained when laminating at lower temperatures. When laminated at 120° C., receivers with silicone contents of 0.8% delaminated in preference to tearing of the Melinex substrate. Similarly, intermediate silicone contents were found to give corresponding intermediate values of laminate strengths.

EXAMPLE 3

To correlate the lowest practical laminating temperatures with the silicone contents, several receiver coating compositions were prepared with differing amounts of silicone (Tegomer H-Si 2210), and corresponding receivers made and printed in the manner of the preceding examples. After printing, these were each laminated to matt PVC under conditions which were as described above, except for the laminating temperatures, which were varied over a range starting at 100° C. The temperature was raised by ten degrees each subsequent time until the level of adhesion was such that the Melinex substrate tore rather than the system delaminating. The results are presented below in tabular form, together with those of Example 4.

EXAMPLE 4

The series of laminations at various temperatures described in the previous example, was repeated except that polycarbonate ("PC") sheets were substituted for the PVC cover sheets. The PC sheets were matt on one side and glossy on the other. Both surfaces were tested for their laminating properties, but no difference was detected, so only one set of PC results is presented in the table below.

| Laminating temperature °C. | Ex 3. PVC cover | Ex 4. PC cover |
|---|---|---|
| | Silicone concentration | |
| 100 | 0.01% | |
| 110 | 0.05%, 0.1%, 0.2% | |
| 120 | 0.3%–0.8% | |
| 130 | | 0.01%–0.3% |
| 140 | | 0.4%–0.8% |

In the above table, the silicone concentrations are given as percentages by weight of the dye-receptive polymer, and the laminating temperatures are the lowest temperatures that met the laminating criteria at the silicone concentrations quoted. No total transfer problems arose with any of these freshly prepared, low-silicone receiver sheets.

The above results illustrate clearly how different polymeric sheets can be used to produce very secure laminates according to the invention (even without the use of added adhesive layer) and also the very different temperatures that may be required with such different polymers. However, the common factor we found when using different polymers was that the appropriate quantity of silicone required remained within the same range.

EXAMPLE 5

The low silicone content of the receiver layer, can also be employed with benefit when using an intervening layer of adhesive.

A cover sheet was first prepared by coating a stiff white polyester sheet (Melinex 990, from ICI) with hot melt adhesive (Vylon 200). This was coated from solution in toluene/MEK mixture, using a K-bar, and allowed to dry. (Hot melt coating would probably have been preferable had the equipment been available at the time.)

Prints were prepared as in the preceding examples, then the cover sheet just prepared was placed on top, with its adhesive coating against the printed receiver layer. Lamination was then carried out using the hot roll laminator as before. The process was repeated with samples of receiver sheet from various manufacturers, all believed to contain much higher concentrations of silicone release systems.

If heated, it was not impossible to delaminate the resultant laminates. At ambient temperatures, however, that having the low silicone content according to the invention was very difficult to delaminate, being significantly more difficult than the others.

EXAMPLE 6

In this example an adhesive layer was again used, but in this case the adhesive and the substrate were formed together as a coextruded laminate, to give a particularly good bond between them. The cover sheet consisted of biaxially orientated polyethyleneterephthalate film, and the coextruded coating was a copolymer of ethyleneterephthalate and ethyleneisophthalate in the ratio 82:18 (Melinex 343 from ICI). Using similar laminating conditions, this was found again to give a good bond with the low silicone content receiver sheet.

We claim:

1. A security laminate comprising
   a) a printed thermal transfer reciever sheet having a substrate supporting a receiver layer comprising a thermoplastic dye-receptive polymer doped with a cross-linked silicone-containing release system, in which the total silicone content lies within the range 0.01-1by weight of the thermoplastic dye-receptive polymer, and into at least part of which has been diffused a print of one or more thermal transfer dyes, and
   b) a cover sheet of plastics material bonded to the printed receiver layer,
   at least one of the base sheet and the cover sheet having sufficient transparecy for the print to be visible from outside the laminate.

2. A security laminate as claimed in claim 1, wherein the cover sheet is a supportive card, to the extent of being the major contributor to the total thickness of the laminate.

3. A security laminate as claimed in claim 2, wherein the cover sheet is opaque.

4. A security laminate as claimed in claim 1, wherein the cover sheet is bonded directly to the reciever layer of the receiver sheet, being free from any layer of added adhesive therebetween.

5. A security laminate as claimed in claim 4, wherein the cover sheet is manufactured of a white filled polyvinylchoride or polycarbonate composition.

6. A security laminate as claimed in claim 1, wherein the substrate, receiver layer and cover sheet are coterminous along all edges.

7. A thermal transfer receiver sheet for making security laminates, comprising a substrate supporting a receiver layer comprising a thermoplastic dye-receptive organic polymer doped with a cross-linked silicone-containing release system in which the total silicone content lies within the range 0.01-1 % by weight of the thermoplastic dye-receptive polymer.

8. A thermal transfer receiver sheet as claimed in claim 7, wherein the substrate is a transparent grade of biaxially orientated polyethylene terephthalate film, and the surface supporting the receiver layer has been pretreated before coating with the receiver layer composition, to enhance its adhesion capabilities before application of the receiver layer thereto, the treatment being in the form of a chemical or physical etch to modify the surface structure of the substrate, or a coating of bonding material adhering well to both substrate and receiver layer.

9. A thermal transfer receiver sheet as claimed in claim 8, wherein the treatment composition for providing the etch is a solution, of p-chloro-m-cresol, 2,4-dichlorophenol, 2,4,6- or 2,4,5-trichorophenol, 4-chlororesorcinol, or a mixture thereof in a common solvent.

* * * * *